United States Patent
Nakano et al.

[11] Patent Number: 6,147,434
[45] Date of Patent: Nov. 14, 2000

[54] DRIVE DEVICE USING ELECTROMECHANICAL TRANSDUCER AND APPARATUS EQUIPPED WITH THE DEVICE

[75] Inventors: Haruyuki Nakano; Satoshi Shinke, both of Sakai; Ryuichi Yoshida, Sagamihara; Yasuhiro Okamoto, Tondabayashi, all of Japan

[73] Assignee: Minolta Co., Ltd., Osaka, Japan

[21] Appl. No.: 09/059,147

[22] Filed: Apr. 13, 1998

[30] Foreign Application Priority Data

Apr. 14, 1997 [JP] Japan .................................. 9-110121

[51] Int. Cl.[7] ................................................... H02N 2/00
[52] U.S. Cl. ............... 310/317; 310/323.17; 310/323.21; 310/346
[58] Field of Search ......................... 310/323.01, 323.17, 310/323.21, 317, 328, 376

[56] References Cited

U.S. PATENT DOCUMENTS

| | | | |
|---|---|---|---|
| 5,089,708 | 2/1992 | Asselbergs | 250/442.11 |
| 5,786,654 | 7/1998 | Yoshida et al. | 310/328 |
| 5,907,212 | 5/1999 | Okada | 310/328 |

FOREIGN PATENT DOCUMENTS

| | | | |
|---|---|---|---|
| 6-123830 | 5/1994 | Japan | G02B 7/04 |
| 9-247967 | 9/1997 | Japan | H02N 2/00 |

*Primary Examiner*—Thomas M. Dougherty
*Attorney, Agent, or Firm*—Sidley & Austin

[57] ABSTRACT

A drive device using a piezoelectric transducer for correcting a shift of a position of a drive system based on a change in an environmental state such as environmental temperature, in which a drive member coupled to the piezoelectric transducer is driven by causing displacements having different speeds by applying drive pulses of saw tooth waves to the piezoelectric transducer thereby moving a slider block frictionally coupled to the drive member, an amount of a shift of a position of the slider block based on the change in the environmental temperature is previously stored to a memory, when a change in temperature is detected by a temperature sensor, the amount of the shift of the position of the slider block is calculated in accordance with the change in temperature and the shift of the position of the slider block is corrected by driving the piezoelectric transducer in a direction of correcting the shift amount by driving a fine adjustment circuit.

31 Claims, 9 Drawing Sheets

DRIVE DEVICE USING ELECTROMECHANICAL TRANSDUCER AND APPARATUS EQUIPPED WITH THE DEVICE

This application is based on the patent application No. 9-110121 filed in Japan, the contents of which is hereby incorporated by reference.

BACKGROUND OF THE INVENTION

1. Field of the Invention

The present invention relates to a drive device using an electromechanical transducer, particularly to a drive device using an electromechanical transducer suitable for driving an X-Y moving stage for precision measurement, a picture taking lens for a camera, a projection lens for an overhead projector, a lens for a binocular or the like.

The present invention also relates to such apparatus as a measuring device, camera or the like equipped with a drive device using an electromechanical transducer.

2. Prior Art

When a drive pulse having a waveform comprising a gradual rise portion and a steep fall portion successive thereto is applied to a piezoelectric transducer, gradual elongation is caused in the thickness direction of the piezoelectric transducer at the gradual rise portion of the drive pulse and rapid contraction is caused at the steep fall portion. Hence, there is known a drive device in which by using this characteristic, charge and discharge are repeated at different speeds by applying a drive pulse having the above-described waveform to a piezoelectric transducer. A drive shaft member fixedly attached to the piezoelectric transducer is reciprocated at different speeds by generating an oscillation in the thickness direction having different speeds at the piezoelectric transducer, thereby moving a moving member frictionally coupled to the drive shaft member in a predetermined direction (refer to Japanese Laid Open Patent Publication No. JP-A-6-123830 as an example).

According to the above-described drive device using a piezoelectric transducer, when an environmental state such as temperature or humidity is changed after positioning a moving member, deformation is caused in a drive system, the moving member is shifted from a set position, and positional error is caused. For example, in the case of investigating how an inspection object is changed in response to environmental temperature, a sample table of a microscope is arranged in a hermetically sealed space, and inspection is carried out by changing the environmental temperature of the hermetically sealed space. In this case, when a drive device using a piezoelectric transducer is used in a device for moving the sample table, there causes inconvenience in the case of observing a change over time of the inspection object in which the sample table is moved by thermal deformation of the drive system caused by a change in the environmental temperature, and the position of the inspection object in the field of view of the microscope is shifted.

SUMMARY OF THE INVENTION

It is a principal object of the present invention lo provide a drive device using a piezoelectric transducer capable of correcting positional shift of a drive system based on a change in an environmental state.

It is another object of the present invention to provide a drive device using a piezoelectric transducer suitable for a device for observing an inspection object while changing an environmental state such as environmental temperature or the like.

It is another object of the present invention to provide a drive device using a piezoelectric transducer where a correction amount of positional shift of a drive system based on a change in an environmental state such as environmental temperature or the like is previously determined, and when the change in the environmental state is detected by a sensor, positional shift of the drive system is corrected based on the predetermined correction amount.

It is a further object of the present invention to provide an apparatus equipped with a drive device using a piezoelectric transducer capable of correcting positional shift of a drive system based on a change in an environmental state.

It is a further object of the present invention to provide an apparatus equipped with a drive device using a piezoelectric transducer suitable for a device for observing an inspection object while changing an environmental state such as environmental temperature or the like.

It is a still further object of the present invention to provide an apparatus equipped with a drive device using a piezoelectric transducer where a correction amount of positional shift of a drive system based on a change in an environmental state such as environmental temperature or the like is previously determined and when the change in the environmental state is detected by a sensor, positional shift of the drive system is corrected based on the predetermined correction amount.

Other objects of the present invention will become apparent from a detailed explanation of the present invention in reference to the drawings.

DETAILED DESCRIPTION OF THE PREFERRED EMBODIMENTS

An explanation will be given of embodiments of the present invention as follows. A first embodiment explained below is an example of applying a drive device to a sample table of an electron microscope, and an environmental state to be controlled is environmental temperature.

The sample table of an electron microscope is arranged inside a hermetically sealed vessel, and its position can be moved by a drive device using an electromechanical transducer arranged outside of the hermetically sealed vessel. The hermetically sealed vessel is constituted such that environmental temperature inside thereof can freely be set, and is further constituted such that even when the position of the sample table is changed by thermal expansion of the drive device caused by a change in environmental temperature, variation in the position can be corrected.

Figure 1:
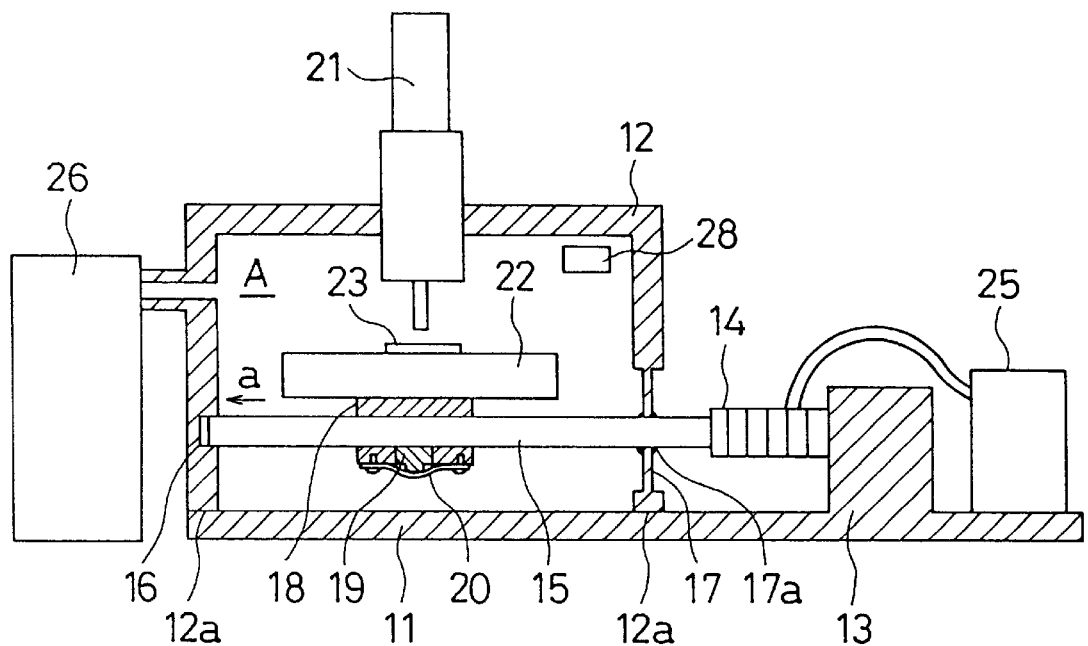
FIG. 1 is a sectional view showing a first embodiment of a drive device for a sample table of an electron microscope to which the present invention is applied.

FIG. 1 is a sectional view of a first example showing the constitution of a drive device of a sample base of an electron microscope. In FIG. 1, a box 12 is arranged on a frame 11, and the frame 11 and the box 12 are tightly coupled by adhesion or other suitable means at portions 12a by which a hermetically seal vessel A is formed. A temperature sensor 28 for measuring environmental temperature inside the vessel A is located at a position that is most convenient for detecting a change in temperature inside of the vessel.

A supporting member 13 is formed on the frame 11, and one end of a piezoelectric transducer 14 is fixedly adhered to a side face of the supporting member 13. A drive shaft 15 penetrates a thin wall portion 17 of the box 12. One end of drive shaft 15 is fixedly connected to an end portion of the piezoelectric transducer 14, and the other end thereof is fitted to and supported by a bearing portion 16 installed inside of the box 12.

The bearing portion 16 is constituted to allow displacement of the drive shaft 15 in the axial direction. The thin wall portion 17 of the box 12, which the drive shaft 15 penetrates, is a circular thin wall portion centering on the penetrating portion of the drive shaft 15. The circular thin wall portion 17 can be deformed elastically to permit axial displacement of drive shaft 15. The drive shaft 15 and the thin wall portion 17 are fixedly adhered by an adhesive agent 17a to maintain air tightness.

By such a constitution, when the piezoelectric transducer 14 is driven, and displacement in the thickness direction is caused, the displacement of the drive shaft 15 in the axial direction is allowed and the hermetically sealed vessel A can be maintained.

The drive shaft 15 penetrates a slider block 18 in the horizontal direction. An opening portion 18a is formed at the lower portion of the slider block 18, which the drive shaft 15 penetrates, and a lower half of the drive shaft 15 is exposed. Further, a pad 19, that is brought into contact with the lower half portion of the drive shaft 15, is inserted into the opening portion 18a. A projection 19a is provided at the lower portion of the pad 19. The projection 19a of the pad 19 is pushed up by a leaf spring 20, and urging force F directed upwardly is exerted on the pad 19 by which the pad 19 is brought into contact with the drive shaft 15. Screws 20a fix the leaf spring 20 to the slider block 18, and the urging force F can be adjusted by adjusting the screws 20a.

Figure 2:
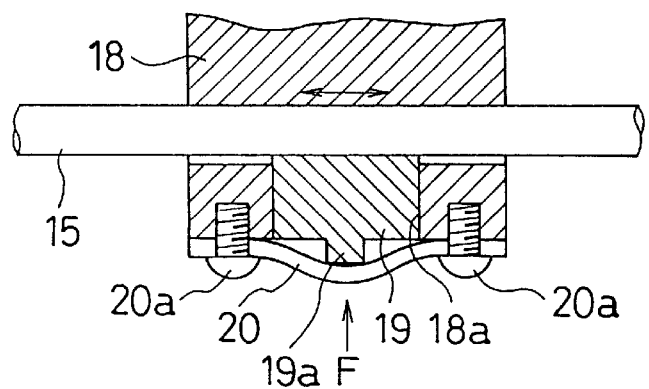
FIG. 2 is an enlarged sectional view showing a frictionally coupled portion of the drive device shown by FIG. 1.

By such a constitution, the slider block 18, the pad 19, and the drive shaft 15 are frictionally coupled by pertinent frictional force by being brought into compressed contact with each other by the urging force F of the leaf spring 20. FIG. 2 is a sectional view showing the constitution of a frictionally coupled portion between the slider block 18, the pad 19, and the drive shaft 15.

Numeral 21 designates an electron microscope, numeral 22 designates a sample table of the electron microscope and numeral 23 designates an inspection object. The sample table 22 is fixed onto the slider block 18 by suitable fixing means of screws or the like. Further, numeral 25 designates a drive control unit for driving the piezoelectric transducer 14 and numeral 26 designates an air conditioner (not illustrated) capable of setting or changing temperature of air or other environmental condition inside the hermetically sealed vessel A to a desired value.

Figure 3:
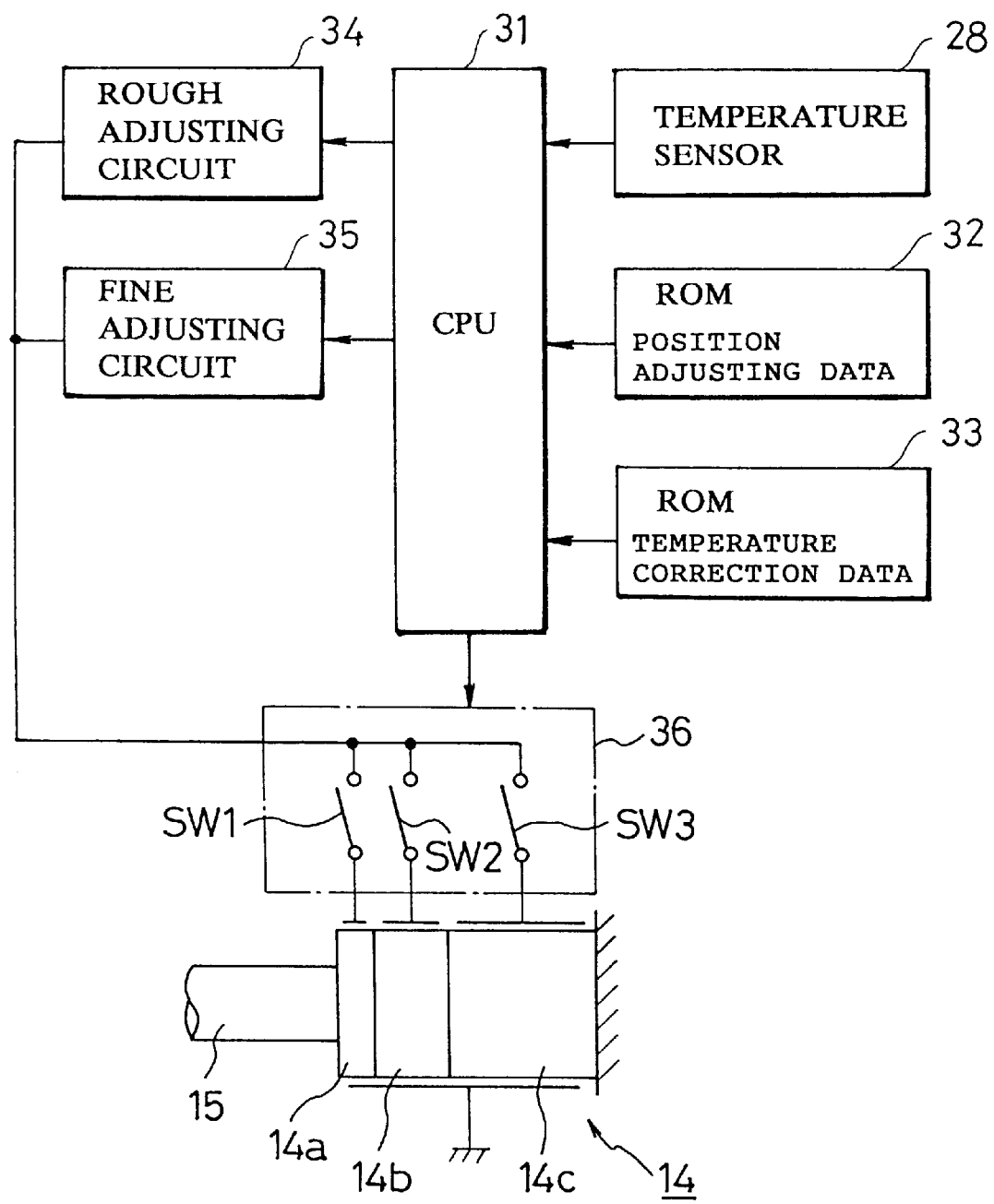
FIG. 3 is a block circuit diagram showing a circuit constitution of a drive control unit.

FIG. 3 is a block circuit diagram showing a circuit of the drive control unit 25. The drive control unit 25 is constituted by CPU 31, a temperature sensor 28 connected to an input port of CPU 31, ROM 32 storing position adjusting data, mentioned later, ROM 33 for storing temperature correction data (described later), a rough adjustment circuit 34, and a fine adjustment circuit 35, both connected to output ports of CPU 31, and a switching circuit 36 having switching elements SW1, SW2 and SW3.

The piezoelectric transducer 14 is constituted by laminating a plurality of blocks, each constituted by laminating a single or a plurality of unit piezoelectric elements. Although according to the embodiment, a first lock 14a is constituted by a single unit element, a second block 14b is constituted by two unit elements, and a third block 14c is constituted by four unit elements, the number of the piezoelectric elements or the number of blocks are not limited thereto, but can be determined arbitrarily.

The first block 14a is connected to the rough adjustment circuit 34 and the fine adjustment circuit 35 via the switching element SW1. The second block 14b is connected to rough adjustment circuit 34 and fine adjustment circuit 35 via the switching element SW2. The third block 14c is connected thereto via the switching element SW3. The above-described switching elements SW1, SW2 and SW3 are constituted by semiconductor switching elements controlled by CPU 31.

Next, an explanation will be given of the operation. First, an explanation will be given of high speed driving by the rough adjustment circuit 34.

In the case of high speed driving, the piezoelectric transducer 14 is driven by applying a drive pulse at a predetermined frequency. When a drive pulse in a saw tooth waveform having a gradual rise portion and a steep fall portion is applied, during the gradual rise portion of the drive pulse, the piezoelectric transducer 14 is displaced to elongate gradually in the thickness direction, and the drive shaft 15 coupled to the piezoelectric transducer 14 is also displaced gradually in the positive direction (arrow mark "a" direction). In this case, the slider block 18, frictionally coupled to the drive shaft 15, and the sample table 22, fixed to the slider block 18, are both moved in the positive direction along with the drive shaft 15 by a frictional coupling force.

During the steep fall portion of the drive pulse, the piezoelectric transducer 14 is displaced to contract rapidly in the thickness direction, and the drive shaft 15 coupled to the piezoelectric transducer 14 is also displaced rapidly in the negative direction (direction opposed to arrow mark "a"). In this case, the slider block 18, frictionally coupled to the drive shaft 15, and the sample table 22, fixed to the slider block 18, remain substantially at the current position by overcoming the frictional coupling force by inertia to remain unmoved. By continuously applying the drive pulse to the piezoelectric transducer 14, the slider block 18 and the sample table 22 fixed thereto can be moved continuously in the positive direction.

Substantial movement mentioned here includes a movement in the arrow mark "a" direction as a whole owing to a difference in drive times, following the drive shaft 15 while causing slip at the frictionally coupled face between the slider block 18 and the drive shaft 15 in either of the positive direction and the direction opposed thereto.

In moving the slider block 18 and the sample table 22 fixed thereto in the negative direction (direction opposed to arrow mark "a"), the movement can be achieved by changing the waveform of the drive pulse in the saw tooth waveform applied to the piezoelectric transducer 14 and applying a drive pulse comprising a steep rise portion and a gradual fall portion.

The moving speed of the slider block 18 and the sample table 22 fixed thereto is a product of an amount of elongation of the piezoelectric transducer and the frequency of the drive pulse when the frequency of the drive pulse is sufficiently lower than the resonance frequency of the drive device. According to an experiment, the frequency of the drive pulse is equal to or lower than half of the resonance frequency of the drive device.

In the case of high speed driving, the first block 14a through the third block 14c are connected to the rough adjustment circuit 34 by suitably selecting the switching elements SW1 through SW3. When the drive pulse voltage applied to the piezoelectric transducer 14 remains the same, the more numerous the number of elements constituting the piezoelectric transducer 14, the greater the elongation, and accordingly, the number of elements may be increased in order to set a faster drive speed.

However, when the number of elements is increased, the resonance frequency of the drive device including the piezoelectric transducer is lowered, and therefore, vibrational sound caused by driving the piezoelectric transducer falls within a range of audible frequencies. This causes not only unpleasant noise, but also lowers the drive speed, and thus the piezoelectric transducer may not be driven in a supersonic region. Accordingly, the number of elements constituting the piezoelectric transducer is limited in this regard.

Next, an explanation will be given of low speed driving by the fine adjustment circuit 35. In low speed driving, elongation displacement or contraction displacement is caused in the piezoelectric transducer by applying direct current voltage thereto by which the piezoelectric transducer is driven to move a very small distance. The amount of elongation or the amount of contraction of the piezoelectric transducer is determined by the number of laminating piezoelectric elements and the applied direct current voltage. Accordingly, positional adjustment data obtained by previously measuring a relationship between the number of laminating piezoelectric elements and the moving distance under constant applied direct current voltage is stored to ROM 32. Thereby, the number of laminations in correspondence with a desired moving distance can simply be calculated.

In the low speed driving, when desired moving distance is determined as mentioned below, the number of laminations is determined by referring to the positional adjustment data stored to the above-described ROM 32. The first block 14a through the third block 14c are connected to the fine adjustment circuit 35 by suitably selecting the switching elements SW1 through SW3.

Figure 4:
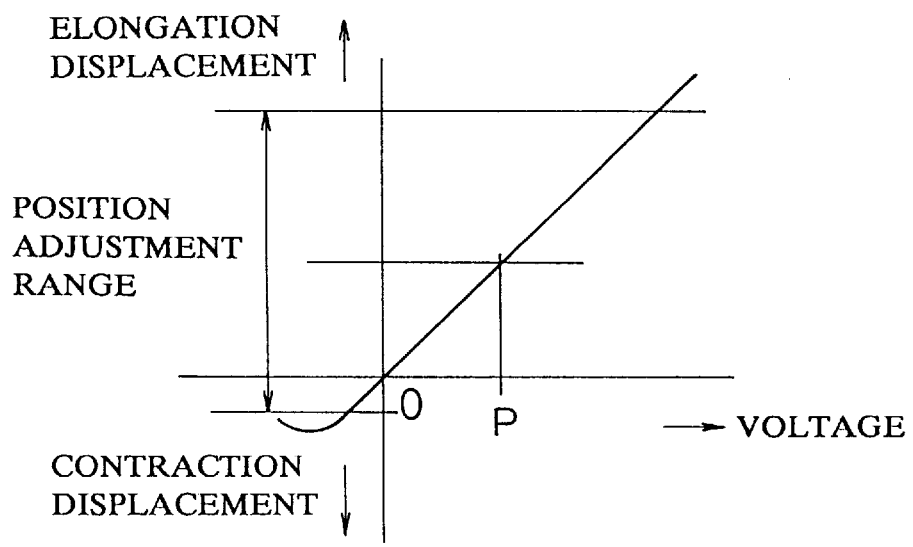
FIG. 4 is a diagram showing a relationship between elongation displacement and contraction displacement and voltage applied to a piezoelectric element.

According to the low speed driving using the fine adjustment circuit 35, elongation displacement or contraction displacement is caused by applying direct current voltage. A relationship between the applied voltage and the displacement caused at the piezoelectric transducer is as shown in FIG. 4. From the characteristic of the piezoelectric transducer, it may be seen that sufficient contraction displacement cannot be provided with respect to negative (minus) voltage. Hence, a positional adjustment range may be set, in which a bias is produced by applying positive (plus) direct current voltage up to point "P" whereby displacements may be provided equally in both directions of elongation displacement and contraction displacement of the piezoelectric transducer.

Next, an explanation will be given of movement of the sample table for the electron microscope by using both the rough adjustment circuit and the fine adjustment circuit. First, the inspection object 23 is mounted on the sample table 22 for the electron microscope. The slider block 18 and the sample table 22 fixed thereto are moved under a field of view by suitably selecting the switching elements SW1 through SW3 in accordance with desired moving speed and operating the rough adjustment circuit by connecting one, two, or a total of the first block 14a through the third block 14c of the piezoelectric transducer to the rough adjustment circuit 34. At this stage, the sample table is not set finely to a predetermined position. The fine adjustment of the position is carried out by the fine adjustment circuit, explained below.

Next, the moving distance for finely adjusting the position of the sample table 22 is determined by means, not illustrated, for example, a graduation or the like provided in the field of view of an electron microscope. The number of laminating piezoelectric elements in accordance with the moving distance is determined by referring to the positional adjustment data stored to ROM 32. The switching elements SW1 through SW3 are suitably selected, either one, two, or a total of the first block 14a through the third block 14c of the piezoelectric transducer are connected to the fine adjustment circuit 35. Thus, the fine adjustment circuit 35 may be operated, and the slider block 18 and the sample table 22 fixed thereto are moved. The sample table 22 can be set to a desired position by the above-described processes.

Figure 5:
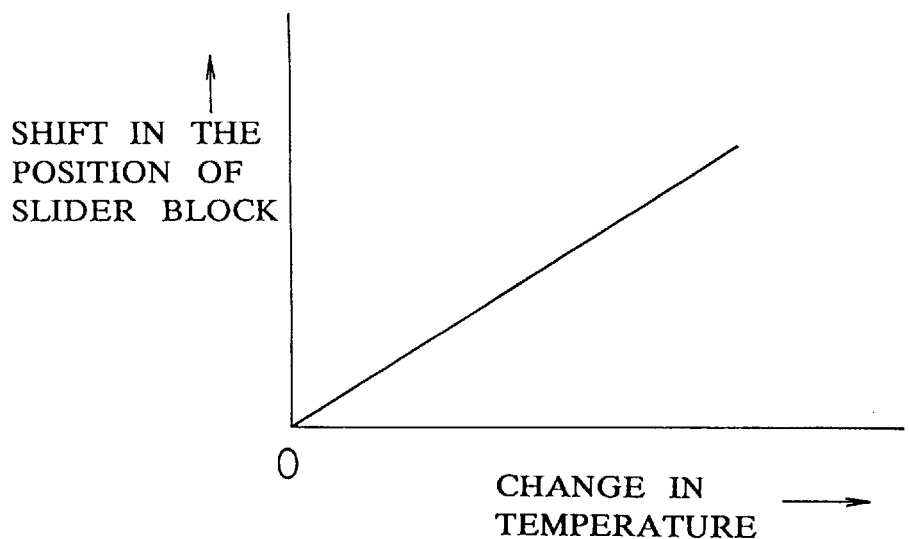
FIG. 5 is a diagram showing a relationship between a change in temperature and displacement caused by thermal expansion of a drive system.

Next, an explanation will be given of correction with respect to positional shift of the sample table for the electron microscope caused by a change in temperature. The drive device is thermally expanded based on a change in temperature and accordingly, the position of the slider block 18 is shifted. The amount of displacement (magnitude of shift) is in a proportional relationship with temperature as shown by FIG. 5. Hence, the amount of displacement of the slider block 18 with respect to a change in temperature is measured previously by an experiment and is stored to ROM 33 as temperature correction data.

The environmental temperature inside the hermetically sealed vessel A is always measured by the temperature sensor 28, and is inputted to CPU 31 of the drive control unit. CPU 31 calculates an amount of change in temperature from the environmental temperature at the initial state where the slider block 18 and the sample table 22 fixed thereto are set at predetermined positions in the field of view of the electron microscope, and calculates an amount of displacement of the slider block 18 in correspondence with the amount of change in temperature by referring to the temperature correction data stored to ROM 33.

The calculated amount of displacement is a moving distance for correcting the position based on the change in temperature. Therefore, the number of laminating piezoelectric elements in accordance with the moving distance is determined by referring to the positional adjustment data stored to ROM 32. The switching elements SW1 through SW3 are suitably selected, either one, two, or a total of the first block 14a through the third block 14c of the piezoelectric element are connected to the fine adjustment circuit 35 to operate the fine adjustment circuit 35 by which the slider block 18 is moved in a direction of correcting the change in the position of the slider block 18 caused by the change in the environmental temperature. In this way, the displacement of the slider block 18 is corrected even with the change in the environmental temperature. Thus the sample table 22 of the electron microscope can be maintained at a predetermined position.

Figure 6:
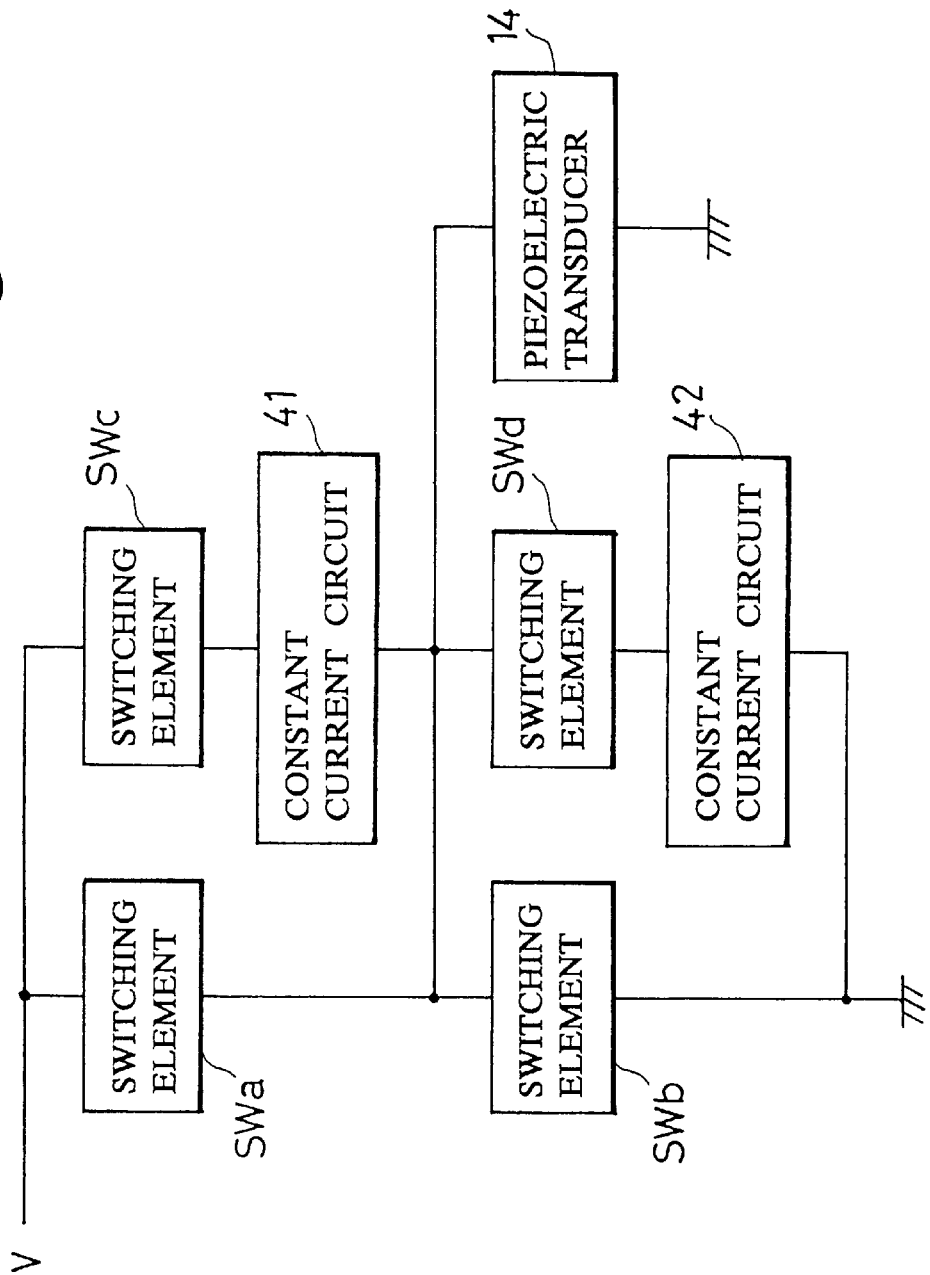
FIG. 6 is a block circuit diagram showing an example of a coarse adjustment circuit and a fine adjustment circuit.

FIG. 6 is a block circuit diagram showing an example of the rough adjustment circuit 34 and the fine adjustment circuit 35. The rough adjustment circuit 34 and the fine adjustment circuit 35 are provided with the same circuit constitution. The rough adjustment circuit (fine adjustment circuit) is comprised of publicly-known constant current circuits 41 and 42 and semiconductor switching elements SWa, SWb, SWc and SWd controlled by CPU 31 of the drive control unit (refer to FIG. 3).

An explanation will be given of the operation of the rough adjustment circuit for high speed driving. When a drive pulse having a gradual rise portion and a steep fall portion is supplied to the piezoelectric transducer 14, the semiconductor switching elements SWa and SWd are maintained in an OFF state by the control of CPU 31. When the semiconductor switching element SWc is turned ON and the semiconductor switching element SWb is turned OFF, constant current flows from a power source V to the piezoelectric transducer 14 via the semiconductor switching element SWc and the constant current circuit 41. The piezoelectric transducer 14 is gradually charged, and as electric charge is accumulated, the terminal voltage gradually increases. Next, when the semiconductor switching element SWb is turned ON and the semiconductor switching element SWc is turned OFF, electric charge applied to the piezoelectric transducer 14 is rapidly discharged via the semiconductor switching element SWb, and the terminal voltage is rapidly reduced to null. By controlling the semiconductor switching elements SWc and SWb by ON/OFF control alternately at a predetermined period, the drive pulse having a gradual rise portion and a steep fall portion can be supplied to the piezoelectric transducer 14.

When a drive pulse having a steep rise portion and a gradual fall portion is supplied to the piezoelectric transducer 14, the semiconductor switching elements SWc and SWb are maintained in an OFF state by the control of CPU 31. When the semiconductor switching element SWa is turned ON and the semiconductor switching element SWd is turned OFF, current flows from the power source V to the piezoelectric transducer 14 via the semiconductor switching element SWa, and the terminal voltage is rapidly increased. Next, when the semiconductor switching element SWd is turned ON and the semiconductor switching element SWa is turned OFF, electric charge applied to the piezoelectric transducer 14 is gradually discharged via the semiconductor switching element SWd, and the constant current circuit 42 and terminal voltage is gradually reduced to null. By controlling the semiconductor switching elements SWa and SWd by an ON/OFF control alternately at a predetermined period, the drive pulse having a steep rise portion and a gradual fall portion can be supplied to the piezoelectric transducer 14.

Next, an explanation will be given of the operation as the fine adjustment circuit for low speed driving. In causing predetermined elongation displacement in the piezoelectric transducer 14, the semiconductor switching elements SWa, SWb and SWd are maintained in an OFF state by the control of CPU 31. When the semiconductor switching element SWc is turned ON, current is gradually charged from the power source V to the piezoelectric transducer 14 via the semiconductor switching element SWc and the constant current circuit 41 whereby electric charge is accumulated and elongation displacement is caused. When the semiconductor switching element SWc is turned OFF at a desired elongation amount, the caused elongation displacement is maintained since electric charge remains. In order to discharge the electric charge, the semiconductor element SWb is turned ON.

In causing predetermined contraction displacement in the piezoelectric transducer 14, the semiconductor switching elements SWb, SWc and SWd are maintained in an OFF state by the control of CPU 31, the semiconductor switching element SWa is turned ON and elongation displacement is caused by charging the piezoelectric transducer 14 up to point "Pl" of the voltage-displacement amount curve shown by FIG. 4. Next, the semiconductor switching element SWa is turned OFF and the semiconductor switching element SWd is turned ON and the electric charge of the piezoelectric transducer 14 is gradually discharged, which causes contraction displacement. The contraction displacement is maintained when the semiconductor switching element SWd is turned OFF at a desired contraction amount.

Next, an explanation will be given of a second embodiment of the present invention as follows. According to the first embodiment explained above, in order to correct a change in the position of the sample table 22 by thermal expansion of the drive device caused by a change in the environmental temperature, the amount of displacement of the slider block 18 with respect to the change in temperature is previously measured by experiment and the amount of displacement with respect to the change in temperature is stored to ROM 33 as temperature correction data.

A rate of change in the position of the sample table 22 by thermal expansion of the drive device is varied depending on the slider block 18's position on the drive shaft 15. That is, when the slider block 18 is disposed on a side proximate to the piezoelectric transducer 14 on the drive shaft 15, the amount of elongation by thermal expansion of the drive shaft 15 is small and accordingly, the change in the position of the sample table 22 is also small. However, the more remote the slider block 18 is disposed from the piezoelectric transducer 14 on the drive shaft 15, the larger the amount of elongation by thermal expansion of the drive shaft 15; and accordingly, the larger the change in the position of the sample table 22 becomes.

The first embodiment described above is effective particularly in the case where the slider block 18 is set to substantially the central portion of the drive shaft 15 and the position is not varied so much. When the slider block 18 is set at any position in a wide range from the side proximate to the piezoelectric transducer 14 to a front end portion on the drive shaft 15, a further device for correction is required if the amount of displacement with respect to the change in temperature is calculated as the single temperature correction data. The second embodiment explained below improves this point.

Figure 9:
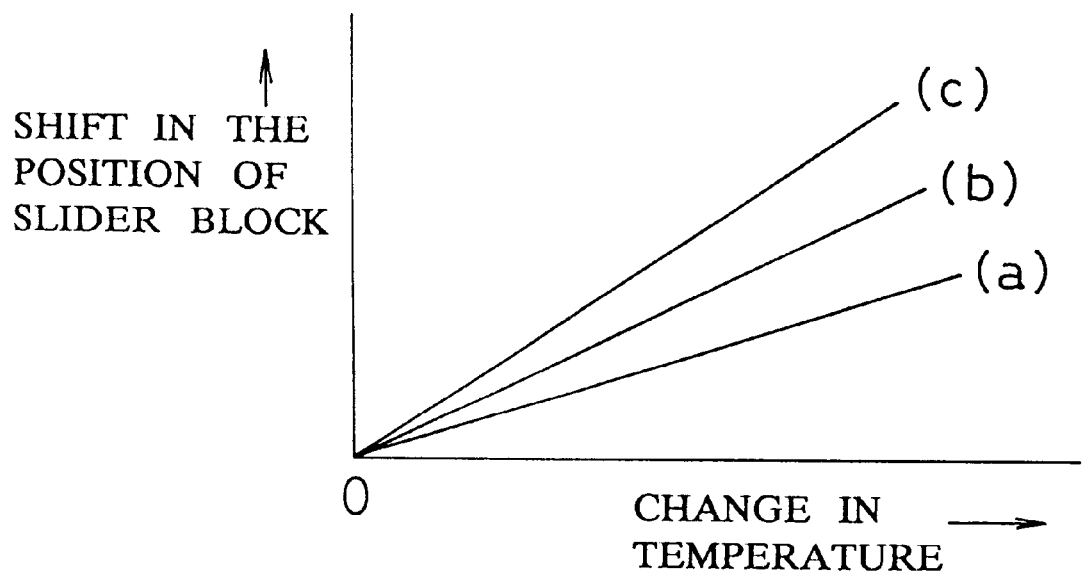
FIG. 9 is a diagram showing a relationship between a change in temperature and displacement caused by thermal expansion of the drive system.

FIG. 9 is a diagram showing a relationship of shift in the position of the slider block 18 with respect to the change in temperature in which a line (a) shows a case where the slider block 18 is on the side proximate to the piezoelectric transducer 14 on the drive shaft 15, a line (b) shows a case where the slider block 18 is disposed substantially at the central portion on the drive shaft 15 and a line (c) shows a case where the slider block 18 is disposed on the side most remote from the piezoelectric transducer 14 on the drive shaft 15.

The amount of displacement of the slider block 18 with respect to the change in temperature is measured previously by experiment, and the amount of displacement with respect to the change in temperature is stored to ROM 33 as temperature correction data concerning the respective three cases of when the slider block 18 is disposed on the side proximate to the piezoelectric transducer 14 on the drive shaft 15, when it is disposed substantially at the central portion on the drive shaft 15 and when it is disposed on the side most remote from the piezoelectric transducer 14 on the drive shaft 15.

Figure 7:
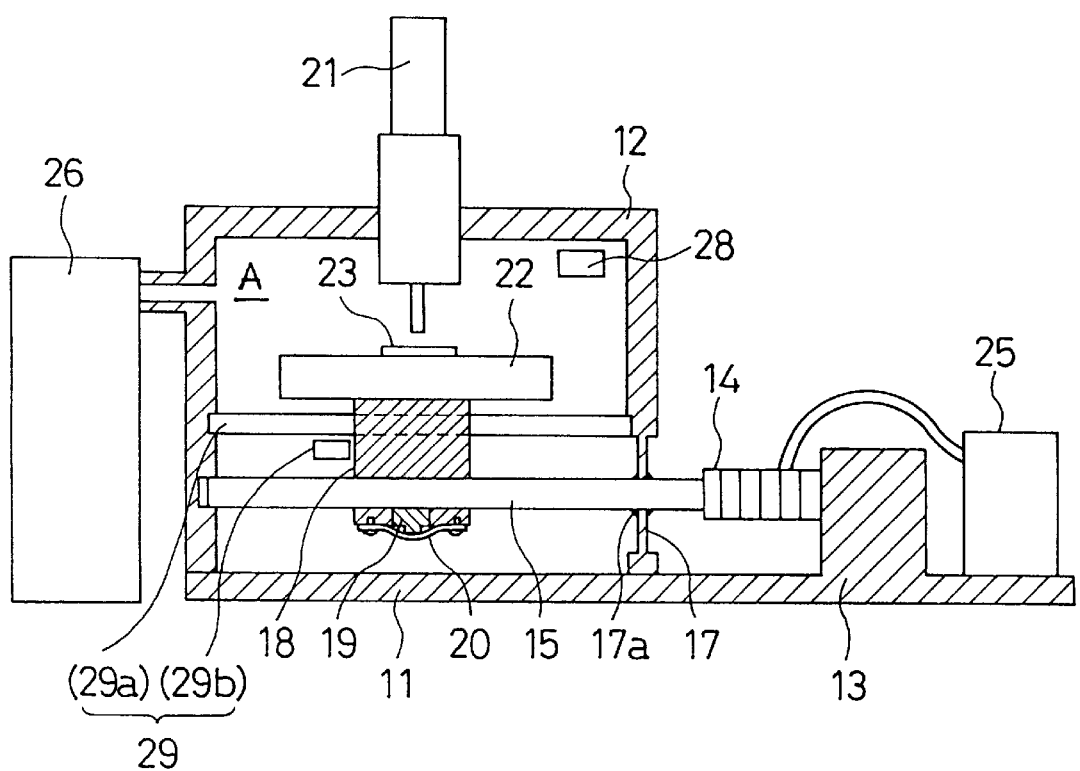
FIG. 7 is a sectional view showing a second embodiment of a drive device for a sample table of an electron microscope.

FIG. 7 is a sectional view showing the constitution of a drive device of a sample of an electron microscope according to the second embodiment. The point of difference from the embodiment shown by FIG. 1 resides in that a position detection sensor 29 for detecting the position of the slider block 18 with respect to the frame 11 is provided. Other aspects remain unchanged from those shown by FIG. 1. Accordingly, the same notations are attached to the same portions and an explanation thereof will be omitted.

The position detection sensor 29 is a publicly-known position detection sensor. For example, in this embodiment, a magnetizing rod 29a where NS magnetic poles are magnetized at constant intervals is arranged in parallel with the drive shaft 15. On the side of the slide block 18, an MR sensor arranged with a magnetic resistance element 29b for detecting changes in NS magnetic poles by approaching the magnetizing rod is used as the position detection sensor 29. Incidentally, precision positional detection is not needed to detect the position of the slider block 18. Accordingly, a sensor having a simple constitution other than the MR sensor may be used.

Figure 8:
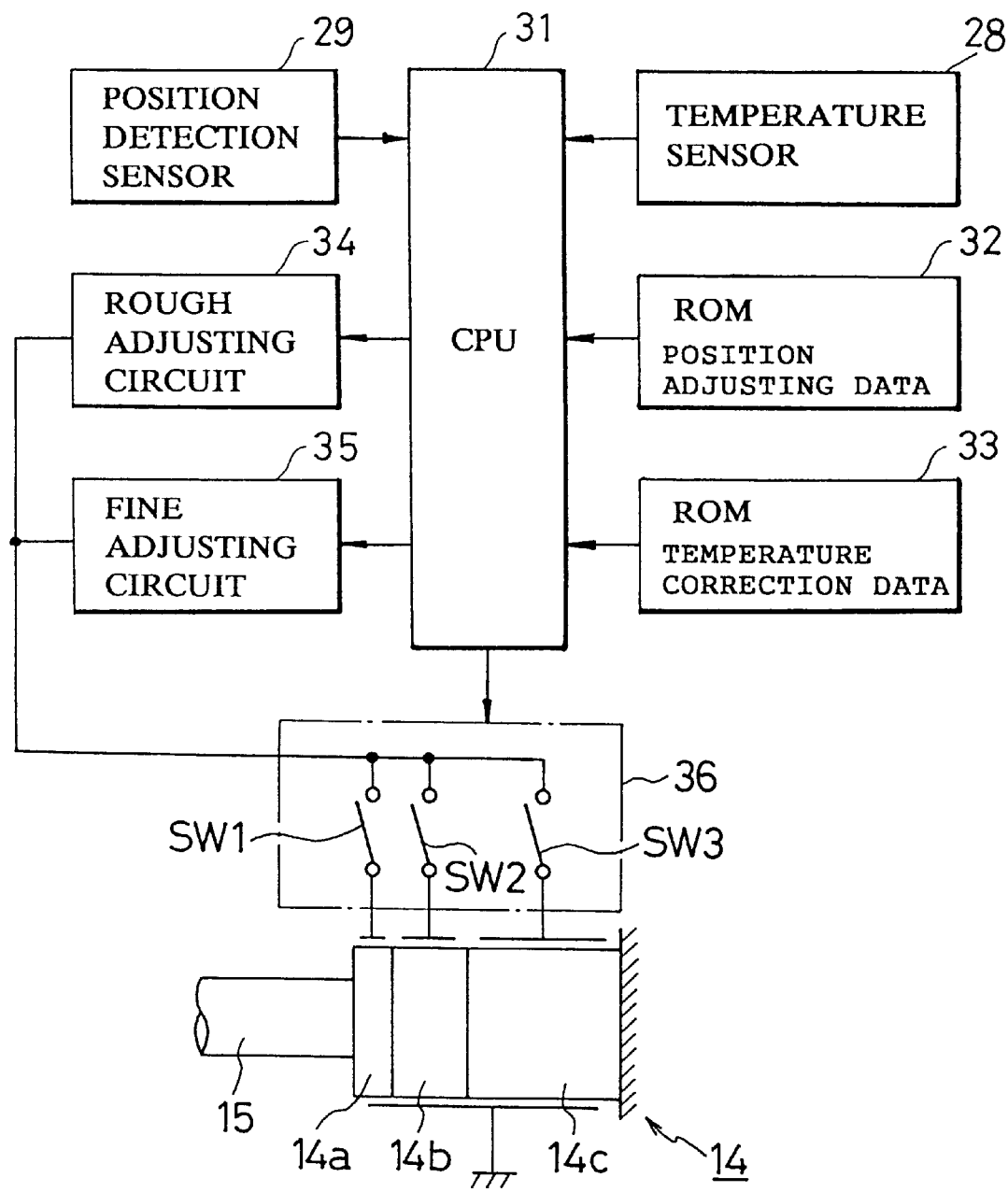
FIG. 8 is a block circuit diagram of a drive control unit for the second embodiment.

FIG. 8 is a block diagram showing the circuit constitution of the drive control unit according to the second embodiment. It differs from the drive control unit shown by FIG. 3 in that the detection signal of the position detection sensor 29 is inputted to CPU 31, and the content of ROM 33 storing the temperature correction data is different. Other points remain unchanged. Accordingly, the same notations are attached to the same portions and an explanation thereof will be omitted.

A difference between the control operation of the drive control unit and the control operation of the drive control unit shown by FIG. 3 is that the amount that the position of the slider block 18 is corrected, with respect to the change in temperature, is changed in accordance with the position of the slider block 18. Other points remain unchanged. Accordingly, an explanation will be given of the difference as follows. The position of the slider block 18 is detected by the position detection sensor 29, and the detection signal is inputted to CPU 31. CPU 31 determines the position of the slider block 18 based on the inputted detection signal, reads the amount of displacement with respect to the change in temperature in correspondence with the position of the slider block 18 stored to ROM 33 as the temperature correction data, and calculates the amount of displacement of the slider block 18 corresponding to the amount of temperature change.

The calculated displacement amount is the moving distance for correcting the position of the slider block 18 based on the temperature change. Accordingly, the number of laminations of the piezoelectric element 14 in accordance with the moving distance is determined by referring to the position adjustment data stored to ROM 32. The switching elements SW1 through SW3 are pertinently selected. Either one, two, or all of the first block 14a through the third block 14c of the piezoelectric transducer 14 are connected to the fine adjustment circuit 35 to thereby operate the fine adjustment circuit 35. Thus, the slider block 18 is moved in a direction so as to correct the change of the position of the slider block 18 caused by the change in the environmental temperature. In this way, shift of the position of the slider block 18 caused by the change in the environmental temperature can pertinently be corrected regardless of the position at which the slider block is disposed on the drive shaft.

Figure 10:
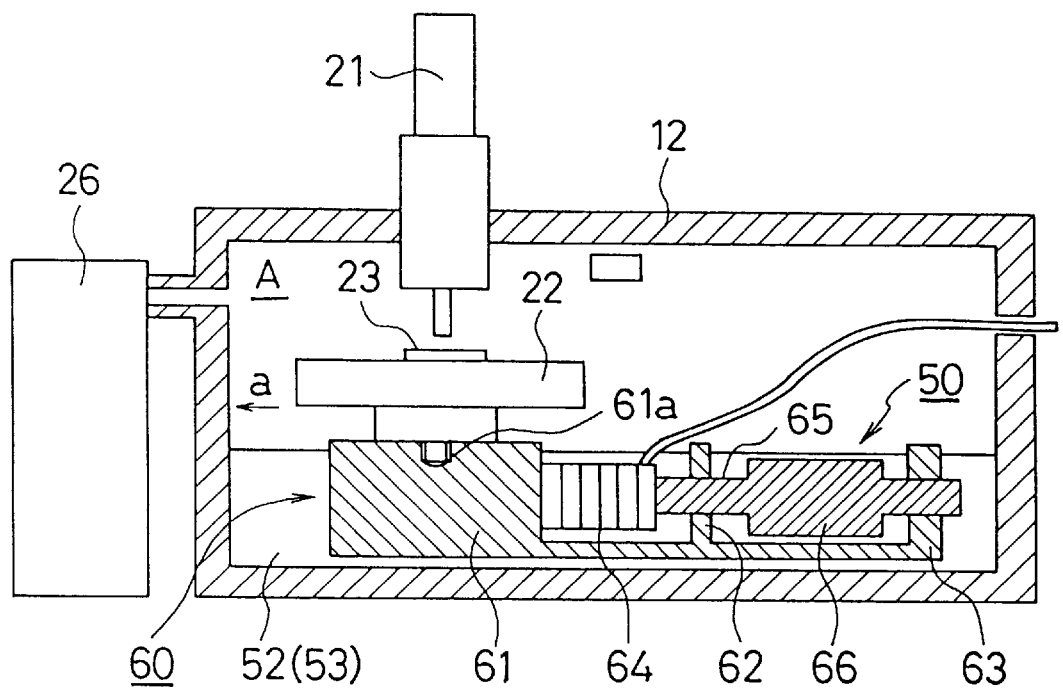
FIG. 10 is a sectional view showing a third embodiment of a drive device for a sample table of an electron microscope.

FIG. 10 is a sectional view showing the constitution of a drive device of a sample table for an electron microscope according to a third embodiment. A difference thereof from the embodiment shown by FIG. 1 resides in that a linear actuator of a self-propelled type having a piezoelectric transducer is adopted as a drive device, and the actuator is arranged inside a hermetically sealed vessel comprising a frame and a box along with a sample table. Other points remain unchanged from the embodiment shown by FIG. 1 and accordingly, the same notations are attached to the same portions. An explanation thereof will be omitted and an explanation will be given of the difference.

A hermetically sealed vessel A is comprised of a frame 11 and a box 12. The sample base 22 of the electron microscope 21 is attached to a drive unit 60 of a self-propelled actuator 50 arranged inside the hermetically sealed vessel A. The drive unit 60 can be driven in an arrow mark "a" direction or a direction opposed thereto by applying a drive pulse of a saw tooth wave having a gradual rise portion and a steep fall portion or a drive pulse of a saw tooth wave having a steep rise portion and a gradual fall portion to a piezoelectric transducer 64 of the actuator 50.

Figure 11:
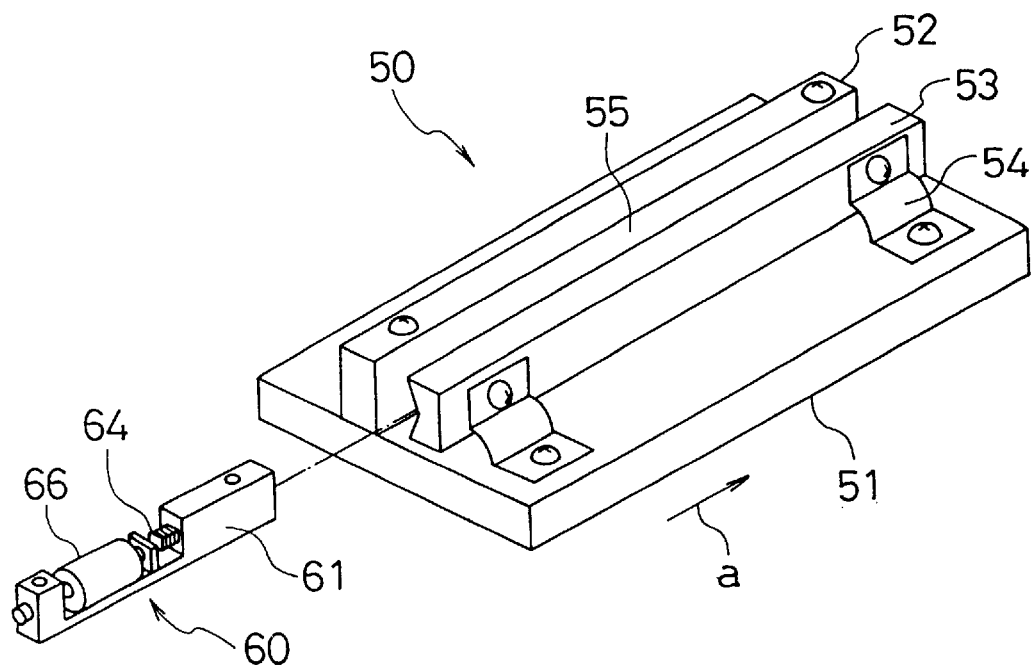
FIG. 11 is a perspective view of a self-propelled type actuator used in the drive device shown by FIG. 10.
Figure 12:
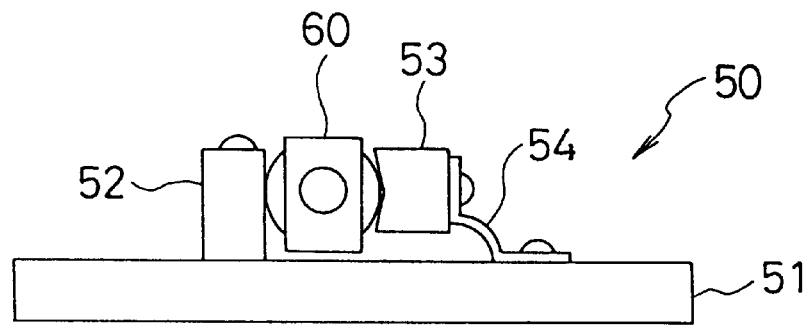
FIG. 12 is a side view of the self-propelled type actuator shown by FIG. 11.
Figure 13:
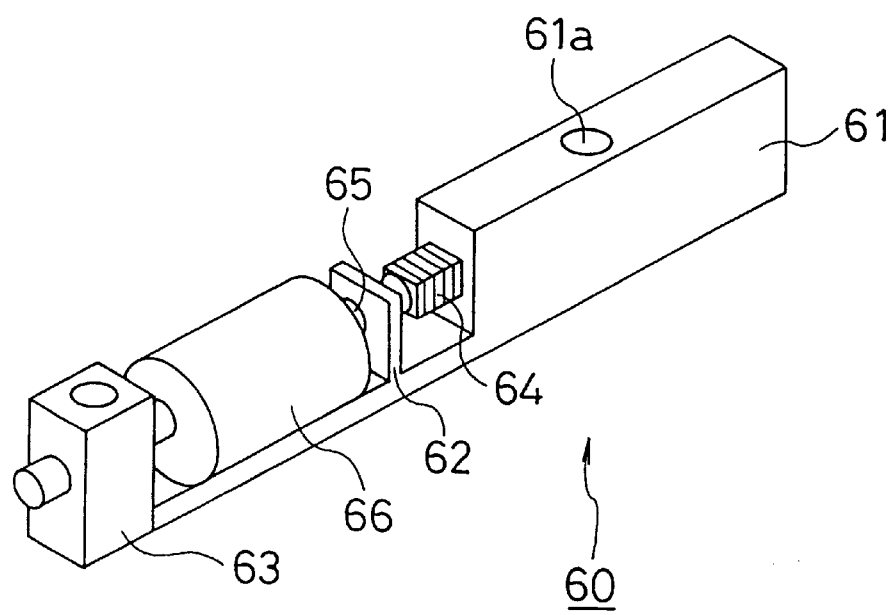
FIG. 13 is a perspective view of a drive unit of the self-propelled type actuator shown by FIG. 11.

An explanation will be given here of the constitution of the linear actuator of a self-propelled type. FIG. 11 is a perspective view showing the constitution of the actuator 50 showing a state where the drive unit 60 is disengaged. Further, FIG. 12 is a side view showing a state where the drive unit 60 is mounted on a main body. FIG. 13 is a perspective view showing the constitution of the drive unit 60.

As shown by FIG. 11 and FIG. 12, the actuator 50 is comprised of a base 51, guide members 52 and 53 constituting a second member installed on the base 51, and the drive unit 60 arranged to interpose between the guide members 52 and 53. A groove having a section in a substantially V-like shape is formed at the guide member 53, and the guide members 52 and 53 are arranged at a predetermined interval 55 to sandwich therebetween a cylindrical body 66 of the drive unit 60, mentioned later, by the guide members 52 and 53 and the guide member 53 is urged toward the cylindrical body 66 by springs 54.

As shown by FIG. 13, the drive unit 60 is comprised of a frame 61, a supporting member 62 and a supporting member 63 integrally formed with the frame 61, the piezoelectric transducer 64, the drive shaft 65 and the cylindrical body 66 which are disposed on the frame 61 and with respect to the drive shaft 65 and the cylindrical body 66 constituting a first member. The cylindrical body 66 is sandwiched by the guide members 52 and 53 constituting the second member. One end of the piezoelectric transducer 64 is fixedly adhered to the side wall of the frame 61 constituting a third member, and the drive shaft 65 is fixedly adhered to the other end of the piezoelectric transducer 64.

Also, the drive shaft 65 is supported by the supporting member 62 and the supporting member 63 is movable in the axial direction. The drive shaft 65 and the cylindrical body 66 can be reciprocated in the axial direction by elongation and contraction of the piezoelectric transducer 64 in the thickness direction. Further, an attaching hole 61a for fixing the sample table 22 is provided in the frame 61.

The mass of the drive shaft 65 and the cylindrical body 66 constituting the first member is smaller than the mass of the frame 61 constituting the third member (first member mass<third member mass).

By this constitution, the guide members 52 and 53 comprising the second member and the cylindrical body 66 of the drive unit 60 constituting the first member are frictionally coupled by pertinent frictional force.

Incidentally, the frame 61 and the supporting member 62 and the supporting member 63, both integrally formed with the frame 61, are not brought into contact with the base 51, the guide members 52 and 53 and the frame 61, and only the cylindrical body 66 is brought into contact with the guide member 52 and the guide member 53 by which the drive unit 60 is held in a floating state.

Next, an explanation will be given of the operation. When a drive pulse of a saw tooth wave having a gradual rise portion and a steep fall portion is applied to the piezoelectric transducer 64 in a state where the cylindrical body 66 of the drive unit 60 is sandwiched by the guide members 52 and 53, and frictionally coupled thereto by pertinent frictional force, at the gradual rise portion of the drive pulse, the piezoelectric transducer 64 is displaced to elongate gradually in the thickness direction. At this moment, the cylindrical body 66 is not moved relative to the guide members 52 and 53, and the frame 61 is moved in the arrow mark "a" direction since the cylindrical body 66 and the guide members 52 and 53 are frictionally coupled.

At the steep fall portion of the drive pulse, the piezoelectric transducer 64 is displaced to contract rapidly in the thickness direction. At this moment, inertia force by which the frame 61 tends to stay at the position overcomes the frictional coupling force between the cylindrical body 66 and the guide members 52 and 53 and therefore, slip is caused between the cylindrical body 66 and the guide members 52 and 53 and the frame 61 remains unmoved.

By continuously applying the drive pulses at the piezoelectric transducer 64, the drive unit 60 can be moved continuously in the arrow mark "a" direction. In moving the drive unit 60 in a direction opposed to the previous direction (direction opposed to arrow mark "a"), the waveform of the drive pulse of the saw tooth wave applied to the piezoelectric transducer 64 may be changed, and a drive pulse comprising a steep rise portion and a gradual fall portion may be applied.

Incidentally, although in the third embodiment shown by FIG. 10, a position detection sensor for detecting the position of the sample table is omitted, the position of the sample table can be detected by installing a position detection sensor having a constitution the same as that in the second embodiment shown by FIG. 7.

Although according to the embodiments of the present invention explained above, an explanation has been given of examples of a microscope where the drive device using the electromechanical transducer is applied in driving the sample table thereof, the apparatus is not limited to a microscope and the drive device using the electromechanical transducer is not limited to the application of driving the sample table for an electron microscope, but is applicable to a drive mechanism of other general devices where shift of position of a moving member caused by thermal expansion of a drive system caused by a change in environmental temperature needs to be corrected.

Further, although according to the embodiments of the present invention explained above, an explanation has been given of examples which are applied to correction of positional shift caused by a change in environmental temperature, the device is applicable not only to the change in environmental temperature but in a correcting device for correcting positional shift based on change in an environmental state such as humidity, atmospheric pressure, electric field, magnetic field and the like.

As has been explained, in a drive device using an electromechanical transducer, there is provided a drive device constituted to correct shift of position of a moving member caused by a displacement of a drive system by change in an environmental state such as temperature, humidity or the like. Accordingly, there can be provided a drive device using an electromechanical transducer such as a drive device for an apparatus for observing a change in a state of an object while changing an environmental state, such as an environmental temperature or the like, or a drive device for an apparatus where a measurement result is influenced by a change in an environmental state and so on.

What is claimed is:

1. A drive device comprising:
   a member assembly;
   an electromechanical transducer;
   a drive member, fixedly coupled to the electromechanical transducer, being frictionally coupled to the member assembly;
   a drive controller for providing a drive signal to the electromechanical transducer, said drive signal controlling elongation and contraction of the electromechanical transducer to effect relative motion between the member assembly and the drive member;
   a state sensor for measuring an environmental state and for providing to the drive controller a state signal corresponding to the environmental state; and
   a correction data storage device for storing predetermined correction data and for providing the predetermined correction data to the drive controller, wherein the predetermined correction data can be used by the drive controller to adjust the relative position between the member assembly and the drive member based on the state signal provided by the state sensor.

2. A drive device according to claim 1, wherein the drive controller includes a coarse adjustment circuit for coarse adjustment of the relative position between the member assembly and the drive member, and the drive signal comprises a drive pulse outputted from the coarse adjustment circuit.

3. A drive device according to claim 2, wherein the drive controller further includes a fine adjustment circuit for fine adjustment of the relative position between the member assembly and the drive member, and the drive signal comprises a direct current voltage outputted from the fine adjustment circuit.

4. A drive device according to claim 3, wherein the direct current voltage is provided with a predetermined bias in a positive direction.

5. A drive device according to claim 1, wherein the environmental state is an environmental temperature, and wherein the state sensor is a temperature sensor.

6. A drive device according to claim 1, wherein the electromechanical transducer includes at least one piezoelectric element.

7. A drive device comprising:

a member assembly;

an electromechanical transducer;

a drive member, fixedly coupled to the electromechanical transducer, being frictionally coupled to the member assembly;

a drive controller for providing a drive signal to the electromechanical transducer, the drive signal controlling the electromechanical transducer to actuate the drive member and thereby adjust a relative position between the member assembly and the drive member;

a state sensor for measuring an environmental state, and for providing to the drive controller a state signal corresponding to the environmental state;

a position detector for detecting a position of the member assembly relative to the drive member, and for providing to the drive controller a position signal corresponding to such; and a correction data storage device for storing predetermined correction data, and for providing the predetermined correction data to the drive controller, wherein the predetermined correction data can be used by the drive controller to adjust the relative position between the member assembly and the drive member based on both the state signal provided by the state sensor and the position signal provided by the position detector.

8. A drive device according to claim 7, wherein the drive controller includes a coarse adjustment circuit for coarse adjustment of the relative position between the member assembly and the drive member, and the drive signal comprises a drive pulse outputted from the coarse adjustment circuit.

9. A drive device according to claim 8, wherein the drive controller further includes a fine adjustment circuit for fine adjustment of the relative position between the member assembly and the drive member, and the drive signal comprises a direct current voltage outputted from the fine adjustment circuit.

10. A drive device according to claim 9, wherein the direct current voltage is provided with a predetermined bias in a positive direction.

11. A drive device according to claim 7, wherein the environmental state is an environmental temperature and the state sensor is a temperature sensor.

12. A drive device according to claim 7, wherein the correction data storage device includes a plurality of predetermined values corresponding to changes in the environmental state, each predetermined value of said plurality of predetermined values corresponding to a position of the movable member relative to the electromechanical transducer.

13. A drive device according to claim 7, wherein the electromechanical transducer includes at least one piezoelectric element.

14. A precision measuring device for measuring an attribute of a sample, the device comprising:

an enclosure in which an environmental state can arbitrarily be set;

a movable sample table positioned within the enclosure to receive a sample for measuring;

a movement mechanism, fixedly coupled to the sample table, to selectively effect a movement of the sample table, the movement mechanism including:

a member assembly;

an electromechanical transducer; and a drive member, fixedly coupled to the electromechanical transducer, being frictionally coupled to the member assembly;

a drive controller for providing a drive signal to the electromechanical transducer, the drive signal controlling the electromechanical transducer to drive the drive member, and thereby adjust a relative position of the sample table;

a state sensor for measuring the environmental state and for providing to the drive controller a state signal corresponding the environmental state; and a correction data storage device for storing predetermined correction data and for providing the predetermined correction data to the drive controller, wherein the predetermined correction data can be used by the drive controller to adjust the relative position of the sample table based on the state signal provided by the state sensor.

15. A precision measuring device for measuring an attribute of a sample, the device comprising:

an enclosure in which an environmental state can arbitrarily be set;

a movable sample table positioned within the enclosure to receive a sample for measuring;

a movement mechanism, fixedly coupled to the sample table, to selectively effect a movement of the sample table, the movement mechanism including:

a member assembly;

an electromechanical transducer; and a drive member, fixedly coupled to the electromechanical transducer, being frictionally coupled to the member assembly;

a drive controller for providing a drive signal to the electromechanical transducer, the drive signal controlling the electromechanical transducer to drive the drive member, and thereby adjust a relative position of the sample table;

a state sensor for measuring the environmental state and for providing to the drive controller a state signal corresponding to the environmental state;

a position detector for detecting the relative position of the sample table, and for providing to the drive controller a position signal corresponding to the relative position of the sample table; and a correction data storage device for storing predetermined correction data and for providing the predetermined correction data to the drive controller, wherein the predetermined correction data can be used by the drive controller to adjust the relative position of the sample table based on the state signal provided by the state sensor.

16. A precision measuring device according to claim 15, wherein the position detector comprises:

a linear magnetic scale having an axis parallel to the guide member, said linear magnetic scale being located within the enclosure and having alternating north and south poles at constant intervals along a length of the linear magnetic scale; and a magnetic sensor, wherein said magnetic sensor outputs a signal corresponding to the relative position of the movable sample table based on detecting changes in magnetic pole along the length of the linear magnetic scale.

17. An apparatus having a drive device, said apparatus comprising:
- a driven member;
- a drive member comprising an electromechanical transducer, the drive member being capable of moving the driven member by elongation and contraction of the electromechanical transducer and a frictional coupling;
- a drive controller for providing a drive signal to the electromechanical transducer, said drive signal effecting elongation and contraction by the electromechanical transducer to move the driven member;
- a state sensor for measuring an environmental state, and for providing to the drive controller a state signal corresponding to the environmental state; and
- a correction data storage device for storing predetermined correction data, and for providing the predetermined correction data to the drive controller, wherein the predetermined correction data can be used by the drive controller to adjust a position of the driven member, based on the state signal provided by the state sensor.

18. An apparatus according to claim 17, wherein the drive controller includes a coarse adjustment circuit for coarse adjustment of the position of the driven member, and the drive signal comprises a drive pulse outputted from the coarse adjustment circuit.

19. An apparatus according to claim 18, wherein the drive controller further includes a fine adjustment circuit for fine adjustment of the position of the movable member, and the drive signal comprises a direct current voltage outputted from the fine adjustment circuit.

20. An apparatus according to claim 19, wherein the direct current voltage is provided with a predetermined bias in a positive direction.

21. An apparatus according to claim 17, wherein the environmental state is an environmental temperature and the state sensor is a temperature sensor.

22. An apparatus according to claim 17, wherein said apparatus is an electron microscope.

23. An apparatus having a drive device, said apparatus comprising:
- a driven member;
- a drive member comprising an electromechanical transducer, the drive member being capable of moving the driven member by elongation and contraction of the electromechanical transducer and by a frictional coupling;
- a drive controller for providing a drive signal to the electromechanical transducer, said drive signal effecting elongation and contraction by the electromechanical transducer to move the driven member;
- a state sensor for measuring an environmental state, and for providing to the drive controller a state signal corresponding to the environmental state;
- a position detector for detecting a position of the driven member, and for providing to the drive controller a position signal corresponding to the relative position of the driven member; and
- a correction data storage device for storing predetermined correction data, and for providing the predetermined correction data to the drive controller, wherein the predetermined correction data can be used by the drive controller to adjust the relative position of the driven member based on the state signal provided by the state sensor.

24. An apparatus according to claim 23, wherein the drive controller includes a coarse adjustment circuit for coarse adjustment of the relative position of the driven member, and the drive signal comprises a drive pulse outputted from the coarse adjustment circuit.

25. An apparatus according to claim 24, wherein the drive controller further includes a fine adjustment circuit for fine adjustment of the position of the driven member, and the drive signal comprises a direct current voltage outputted from the fine adjustment circuit.

26. An apparatus according to claim 25, wherein the direct current voltage is provided with a predetermined bias in a positive direction.

27. An apparatus according to claim 23, wherein the environmental state is an environmental temperature and the state sensor is a temperature sensor.

28. An apparatus according to claim 23, wherein the apparatus is an electron microscope.

29. An electron microscope comprising:
- an enclosure in which an environmental state can arbitrarily be set;
- a movable sample table, positioned within the enclosure, for receiving a sample;
- a drive member comprising an electromechanical transducer, the drive member being capable of moving the sample table by elongation and contraction of the electromechanical transducer and by a frictional coupling;
- a drive controller for providing a drive signal to the electromechanical transducer, said drive signal effecting elongation and contraction by the electromechanical transducer to move the sample table;
- a state sensor for measuring an environmental state, and for providing to the drive controller a state signal corresponding to the environmental state; and
- a correction data storage device for storing predetermined correction data, and for providing the predetermined correction data to the drive controller, wherein the predetermined correction data can be used by the drive controller to adjust a position of the sample table based on the state signal provided by the state sensor.

30. An electron microscope comprising:
- an enclosure in which an environmental state can arbitrarily be set;
- a movable sample table, positioned within the enclosure, for receiving a sample;
- a drive member comprising an electromechanical transducer, the drive member being capable of moving the sample table by elongation and contraction of the electromechanical transducer and by a frictional coupling;
- a drive controller for providing a drive signal to the electromechanical transducer, said drive signal effecting elongation and contraction by the electromechanical transducer to move the sample table;
- a state sensor for measuring an environmental state, and for providing to the drive controller a state signal corresponding to the environmental state;
- a position detector for detecting a position of the sample table, and for providing to the drive controller a position signal corresponding to the position of the sample table; and
- a correction data storage device for storing predetermined correction data, and for providing the predetermined correction data to the drive controller, wherein the predetermined correction data can be used by the drive controller to adjust the position of the sample table based on the state signal provided by the state sensor.

31. An electron microscope according to claim 30, wherein the position detector comprises:

a linear magnetic scale having an axis parallel to the drive member, said linear magnetic scale being located within the enclosure and having alternating north and south poles at constant intervals along a length of the linear magnetic scale; and a magnetic sensor, wherein said magnetic sensor outputs a signal corresponding to the position of the sample table based on detected changes of magnetic pole along the length of the linear magnetic scale.

* * * * *